(12) United States Patent (10) Patent No.: US 9,425,984 B2
Lamb et al. (45) Date of Patent: Aug. 23, 2016

(54) SYSTEM AND METHOD FOR USING ENERGY EFFICIENT ETHERNET TO CONTROL ENERGY EFFICIENCIES IN LOWER LAYERS

(71) Applicant: Broadcom Corporation, Irvine, CA (US)

(72) Inventors: Lowell David Lamb, San Ramon, CA (US); Wael William Diab, San Francisco, CA (US)

(73) Assignee: BROADCOM CORPORATION, Irvine, CA (US)

( * ) Notice: Subject to any disclaimer, the term of this patent is extended or adjusted under 35 U.S.C. 154(b) by 516 days.

(21) Appl. No.: 13/783,743

(22) Filed: Mar. 4, 2013

(65) Prior Publication Data

US 2014/0181548 A1 Jun. 26, 2014

Related U.S. Application Data

(60) Provisional application No. 61/745,650, filed on Dec. 24, 2012.

(51) Int. Cl.
*H04L 12/413* (2006.01)
*G06F 1/32* (2006.01)

(52) U.S. Cl.
CPC .................. *H04L 12/413* (2013.01); *G06F 1/32* (2013.01); *Y02B 60/43* (2013.01); *Y02B 60/44* (2013.01)

(58) Field of Classification Search
CPC ............... G06F 1/32; G06F 1/26; G06F 1/28; H04L 12/413; H04L 12/66
USPC ......... 713/300, 310, 320, 321, 322, 323, 324, 713/330, 345, 375
See application file for complete search history.

(56) References Cited

U.S. PATENT DOCUMENTS

| 7,453,880 | B2 * | 11/2008 | Tanaka | 370/395.1 |
| 7,746,883 | B2 * | 6/2010 | Erickson | H04L 47/10 370/419 |
| 8,156,353 | B2 * | 4/2012 | Tsai | 713/310 |
| 8,295,312 | B2 * | 10/2012 | Diab | H04J 3/0682 370/503 |
| 2002/0046355 | A1 * | 4/2002 | Takeuchi | G06F 1/3203 713/320 |
| 2009/0077401 | A1 * | 3/2009 | Tsai | G06F 1/3209 713/320 |
| 2010/0017632 | A1 * | 1/2010 | Cooper | G06F 1/3221 713/320 |
| 2010/0023658 | A1 * | 1/2010 | Diab et al. | 710/59 |
| 2010/0111081 | A1 * | 5/2010 | Diab | H04L 12/12 370/389 |
| 2011/0029796 | A1 * | 2/2011 | Matthews et al. | 713/323 |
| 2012/0078690 | A1 * | 3/2012 | Harriman | G06Q 30/0241 705/14.4 |
| 2012/0163806 | A1 * | 6/2012 | Yoo | H04L 12/4633 398/25 |
| 2015/0003466 | A1 * | 1/2015 | Soffer et al. | 370/412 |

* cited by examiner

*Primary Examiner* — Jaweed A Abbaszadeh
*Assistant Examiner* — Keshab Pandey
(74) *Attorney, Agent, or Firm* — Foley & Lardner LLP

(57) ABSTRACT

A system and method for using energy-efficient Ethernet to control energy efficiency in lower layers. In one example, an energy-efficiency control policy in a first Ethernet device can be configured to determine a need for transitioning of at least a part of the first Ethernet device into an energy saving state. Based on such a determination, an energy-efficiency control signal can be transmitted from the first Ethernet device to a first non-Ethernet device. The receipt of the energy-efficiency control signal by the first non-Ethernet device is used to initiate a transition by the first non-Ethernet device into an energy saving state, which in turn may initiate a transition by downstream non-Ethernet devices into an energy saving state. This process creates a single unified energy-efficiency policy domain.

22 Claims, 4 Drawing Sheets

SYSTEM AND METHOD FOR USING ENERGY EFFICIENT ETHERNET TO CONTROL ENERGY EFFICIENCIES IN LOWER LAYERS

This application claims priority to provisional application Ser. No. 61/745,650, filed Dec. 24, 2012, which is incorporated herein by reference in its entirety.

BACKGROUND

1. Field of the Invention

The present invention relates generally to energy efficiency and, more particularly, to a system and method for using energy-efficient Ethernet to control energy efficiency in lower layers.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy-efficient networks has arisen to address the rising costs of IT equipment usage as a whole (i.e., PCs, displays, printers, switches, servers, network equipment, etc.).

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which is illustrated, in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts. The inherent simplicity of Ethernet has enabled application of the technology to various mediums, various speeds, and various distances. These features have enabled Ethernet to become a viable technology option that spans high-speed laboratory networks, commercial networks, and increasingly to consumer networks.

The pervasiveness of Ethernet and other networking technologies has lead to an increased focus on energy efficiency. Various challenges in producing energy savings exist. In one application, increased energy efficiency is desired where Ethernet traffic is carried over non-Ethernet transport systems.

Consider, for example, a transmission system where a first Ethernet device communicates with a second Ethernet device via a non-Ethernet communication link (e.g., copper twisted pair, coaxial cable, fiber optic, wireless, etc.) between a first non-Ethernet device coupled to the first Ethernet device and a second non-Ethernet device coupled to the second Ethernet device. In this scenario, an energy-efficiency control policy in the first Ethernet device can be configured to determine a need for transitioning of at least a part of the first Ethernet device into an energy saving state. Based on such a determination, an energy-efficiency control signal can be transmitted from the first Ethernet device to the first non-Ethernet device. In one embodiment, the energy-efficiency control signal is an in-band control signal. In another embodiment, the energy-efficiency control signal is an out-of-band control signal. The receipt of the energy-efficiency control signal by the first non-Ethernet device is used to initiate a transition by the first non-Ethernet device into an energy saving state. By this process, a single unified energy-efficiency policy domain is created, wherein the single energy-efficiency policy domain includes an Ethernet device and a non-Ethernet device. In various embodiments, the energy-efficiency control policy of the Ethernet device can supply energy-efficiency functions (e.g., buffering, monitoring, policy control, etc.) for a non-Ethernet device that does not have energy-efficiency control features, or can substitute for energy-efficiency control features of the non-Ethernet device.

Figure 1:
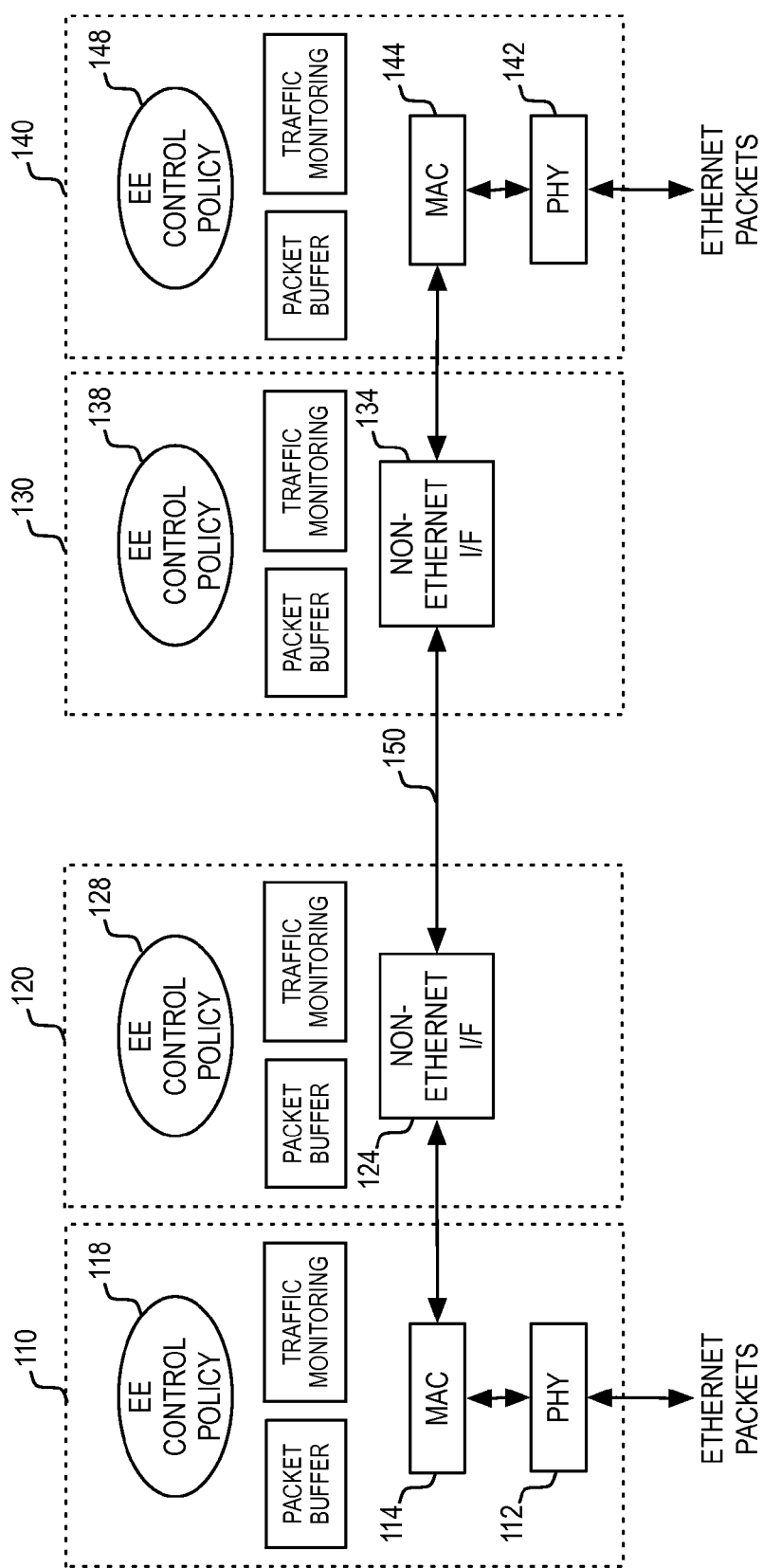
FIG. 1 illustrates an example of a system that enables transmission of Ethernet packets over a non-Ethernet interface.

FIG. 1 illustrates an example of a system that enables transmission of Ethernet packets over a non-Ethernet interface. As illustrated, the system includes Ethernet device 110, which is configured to communicate with Ethernet device 140. In one communication direction, Ethernet packets are received in physical layer device (PHY) 112 of Ethernet device 110 and forwarded to media access control (MAC) 114. These Ethernet packets are to be communicated from Ethernet device 110 to Ethernet device 140 for processing by corresponding MAC 144 and PHY 142. In general, PHY 112 and 142 can be configured to handle physical layer requirements, which include, but are not limited to, packetization, data transfer and serialization/deserialization (SERDES), while MAC 114 and 144 can comprise suitable logic, circuitry, and/or code that may enable handling of data link layer (Layer 2) operability and/or functionality. It should be noted that one or both of PHY 112 and 142 may not be present depending on the implementation.

In the example illustration of FIG. 1, Ethernet packets are communicated between Ethernet device 110 and Ethernet device 140 via a lower layer non-Ethernet transport system. This lower layer non-Ethernet transport system is illustrated by the non-Ethernet communication link formed between non-Ethernet interface module 124 of non-Ethernet device 120 and non-Ethernet interface module 134 of non-Ethernet device 130. It should be noted that the non-Ethernet functions that connect to the media have been designated as an interface (I/F) rather than as MAC and PHY. This recognizes the fact that some of the non-Ethernet transport systems may not follow the OSI seven-layer model.

Communication medium 150 that is used for communication between non-Ethernet interface module 124 and non- Ethernet interface module 134 can be embodied in various forms. In one example, communication medium 150 is embodied as a copper twisted pair link, which can support various transmission technologies such as ADSL/ADSL2, VDSL/VDSL2, ITU-T G.fast, HPNA, T1/E1, T3/E3, etc. In another example, communication medium 150 is embodied as a coaxial cable link, which can support various transmission technologies such as DOCSIS, MOCA, etc. In another example, communication medium 150 is embodied as a fiber optic link, which can support various transmission technologies such as SONET, SDH, ITU-T GPON, xGPON1, NGPON2, etc. In yet another example, communication medium 150 is embodied as a wireless link, which can support various transmission technologies such as WiFi, WiMAX, Microwave, etc.

In one example, each of Ethernet devices 110 and 140 and each of non-Ethernet devices 120 and 130 include an energy-efficiency control policy for producing energy savings. As illustrated, each of energy-efficiency control policies 118, 128, 138 and 148 can be configured to leverage packet buffer resources and traffic monitoring functions within the respective devices. As would be appreciated, packet buffer resources can be used to facilitate transitions between energy saving states to ensure that packets are not dropped. For example, packet buffers can buffer traffic that is received for transmission while a transmission subsystem completes a wake-up process from an energy saving state. Traffic monitoring functions, on the other hand, can be used to monitor link utilization levels to enable an energy-efficiency control policy to determine when a transition to/from an energy saving state is warranted. For example, traffic monitoring functions can monitor traffic queues to determine when link utilization levels have dropped below a threshold value. As would be appreciated, the particular packet buffering mechanism and traffic monitoring functions that are utilized by an energy-efficiency control policy would be implementation dependent and would not detract from the principles of the present invention.

In one embodiment, energy-efficiency control policies 118, 148 in Ethernet device 110 and 140, respectively, are based on various IEEE 802.3 efforts (e.g., 802.3az-2010, P802.3bj, P802.3bm, P802.3bn, P802.3bp, P802.3bq, P1904.1, etc.). At a broad level, energy-efficiency control policies 118, 148 can be configured to determine when to enter an energy saving state, what energy saving state (e.g., level of energy savings) to enter, how long to remain in that energy saving state, what energy saving state to transition to out of the previous energy saving state, etc. As part of this process, energy-efficiency control policies 118, 148 can be used to minimize a negative transmission performance impact by controlling latency, packet loss, and packet jitter, while maximizing energy savings. In one embodiment, energy-efficiency control policies 118, 148 can base these energy-saving decisions on a combination of settings established by an IT manager and the properties of the traffic on the link itself.

In general, energy-efficiency control policy entities 118, 148 can comprise suitable logic, circuitry, and/or code that may be enabled to establish and/or implement an energy-efficiency control policy for the Ethernet device. In various embodiments, energy-efficiency control policy entities 118, 148 can be a logical and/or functional block, which may, for example, be implemented in one or more layers, including portions of the PHY or enhanced PHY, MAC, switch, controller, or other subsystems in a host, thereby enabling energy-efficiency control at one or more layers.

In one example, substantial energy savings can be enabled through the use of a low power idle mode and/or subrating. In general, the low power idle mode can be entered when a transmitter enters a period of silence when there is no data to be sent. Power is thereby saved when the link is off. Refresh signals can be sent periodically to enable wake up from the sleep mode.

Subrating can be used to reduce the link rate to a sub-rate of the main rate, thereby enabling a reduction in power. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate (e.g., turning off three of four channels). In another embodiment, slowing down the clock rate of a parent PHY can enable the subset PHY technique. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10G enhanced core can be transitioned down to a 1G link rate when idle, and sped back up to a 10G link rate when data is to be transmitted.

In general, both the subrating and low power idle techniques involve turning off or otherwise modifying portions of the PHY during a period of low link utilization. As in the PHY, power savings in the higher layers (e.g., MAC) can also be achieved by using various forms of subrating as well.

In the present invention, it is recognized that the operation of the energy-efficiency control policies 118, 148 within Ethernet devices 110, 140, are not typically synchronized with the energy-efficiency control policy entities 128, 138 in non-Ethernet devices 120, 130. This lack of synchronization between the energy-efficiency control policy entities can lead to unpredictable and sub-optimum performance. Moreover, the considerable overlap/duplication of energy-efficiency functionality between Ethernet devices 110, 140 and non-Ethernet devices 120, 130 can lead to unnecessary complexity, cost, die area, etc.

Figure 2:
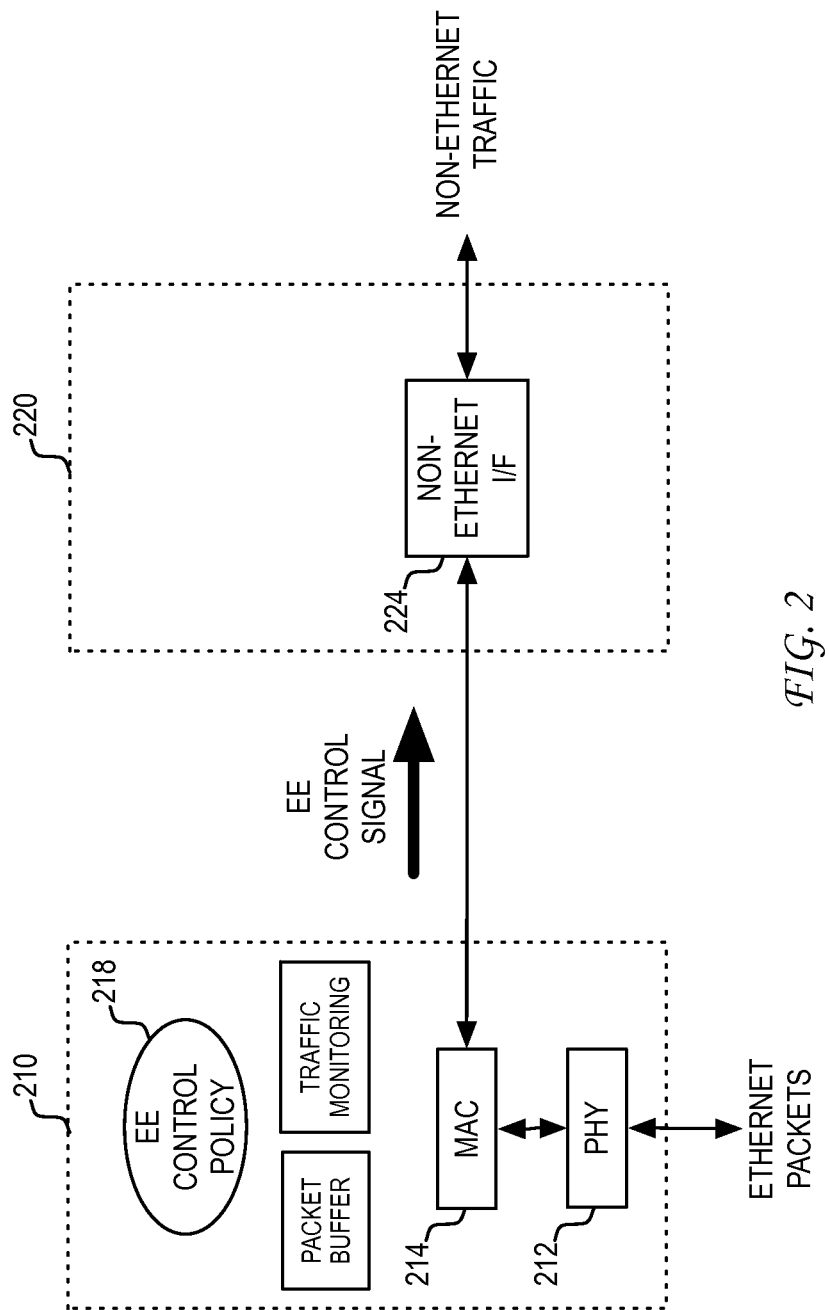
FIG. 2 illustrates an example of a control of the energy-efficiency operation in a lower layer by an energy-efficient Ethernet device.

It is therefore a feature of the present invention that an energy-efficiency control policy within an Ethernet device can be designed to control the energy-efficiency functionality within a non-Ethernet device. FIG. 2 illustrates an example of a control of an energy-efficiency operation in a lower layer by an energy-efficient Ethernet device. As illustrated, Ethernet device 210 is coupled to a lower layer non-Ethernet transport device 220 in a manner similar to that described in FIG. 1.

In the course of operation by Ethernet device 210, the level of link utilization can be monitored by energy-efficiency control policy 218 based on the traffic monitoring functions of the PHY or on higher-layer traffic monitoring functions (e.g., LLDP-based layer-2 protocol as a communications channel) to control the duty cycle and power consumption of the PHY and other system elements. The monitoring by the traffic monitoring functions can enable a determination that the link utilization justifies a transition to an energy saving state. For example, the link traffic monitoring functions can enable a determination that a transition to a low power idle state is warranted if no traffic is present on the link, can enable a determination that a transition to a subrating state is warranted if a low level of traffic is present on the link, etc.

Based on such a determination, energy-efficiency control policy 218 can instruct one or more components within Ethernet device 210 to transition to an energy saving state. For example, energy-efficiency control policy 218 can control a transition of one or more parts of PHY 212, an interface between PHY 212 and MAC 214, MAC 214, a host, etc. into an energy saving state. In addition to the control of one or more components within Ethernet device 210, energy-efficiency control policy 218 is also configured to control the energy-efficiency functions in non-Ethernet device 220. This additional span of control by energy-efficiency control policy 218 ensures that the energy-efficiency functionality of non-Ethernet device 220 is coordinated with the energy-efficiency functionality of Ethernet device 210. This coordination produces greater efficiencies as compared to independent operation of the energy-efficiency functionalities of Ethernet device 210 and non-Ethernet device 220.

As illustrated in FIG. 2, energy-efficiency control policy 218 in Ethernet device 210 is configured to initiate the transmission of an energy-efficiency control signal to non-Ethernet device 220. This energy-efficiency control signal is designed to trigger changes in operating state of non-Ethernet interface module 224 to realize energy savings. It should be noted that the transition to/from an energy saving state of non-Ethernet interface module 224 can be facilitated by packet buffers in Ethernet device 210. Packet buffering within non-Ethernet device 220 would not be required.

In one embodiment, the energy-efficiency control signal is an in-band signal. For example, energy-efficiency signal can be transmitted in a packet header, during an inter-frame gap, etc. in the data communication channel. In another embodiment, the energy-efficiency control signal is an out-of-band signal that is received outside of the data communication channel. As would be appreciated, the particular form of the energy-efficiency control signal would represent an implementation dependent detail. Regardless of its implementation, the transmission of an energy efficiency-control signal from Ethernet device 210 to non-Ethernet device 220 enables an extension of the energy-efficiency control policy domain.

It should be noted that many lower-layer interfaces lack the intelligence or capability to facilitate the operation of a control mechanism for energy efficiency. FIG. 2 illustrates such a scenario where non-Ethernet device 220 is a simple device (e.g., media converter) that cannot inspect packets, cannot detect the presence or absence of traffic, and hence, cannot support an energy-efficiency control policy. In this example, the extension of the energy-efficiency control policy domain of Ethernet device 210 to include non-Ethernet device 220 serves to further the potential of realizing energy savings to a device that would otherwise be unable to produce energy savings during operation.

Figure 3:
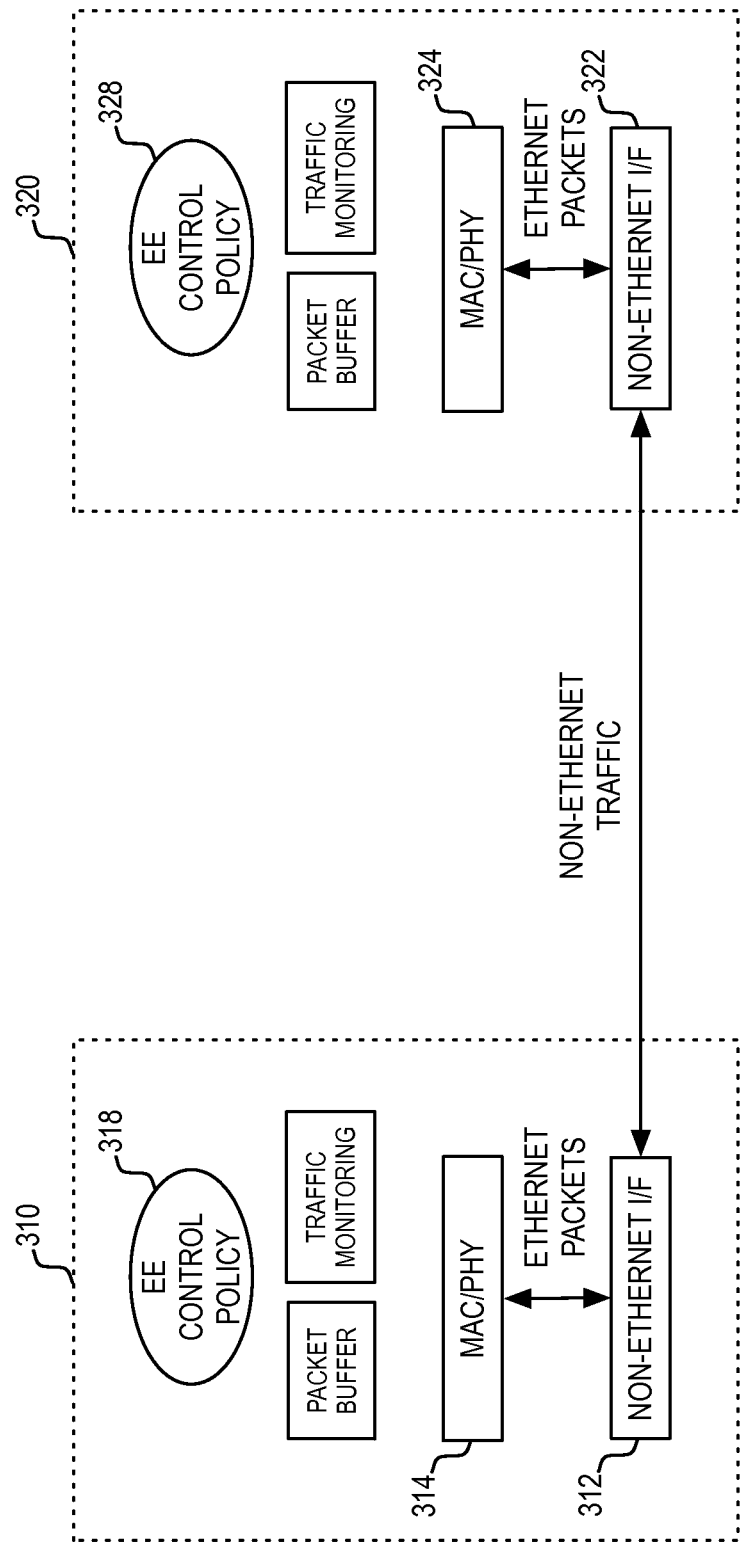
FIG. 3 illustrates an example of a unified energy-efficiency control policy domain.

FIG. 3 illustrates the creation of a unified energy-efficiency control policy domain. As compared to the illustration of FIG. 1, energy-efficiency control policy domain 310 includes the energy-efficiency functionality of Ethernet device MAC/PHY functionality 314, and non-Ethernet interface module 312, while energy-efficiency control policy domain 320 includes the energy-efficiency functionality of Ethernet device MAC/PHY functionality 324, and non-Ethernet interface module 322. In effect, non-Ethernet interface modules 312, 314 now represent the lowest layer of functionality within the energy-efficiency control policy domain, which is under the control of a single energy-efficiency control policy. Efficiency of operation by all energy saving functions within the single energy-efficiency control policy domain is thereby realized.

Figure 4:
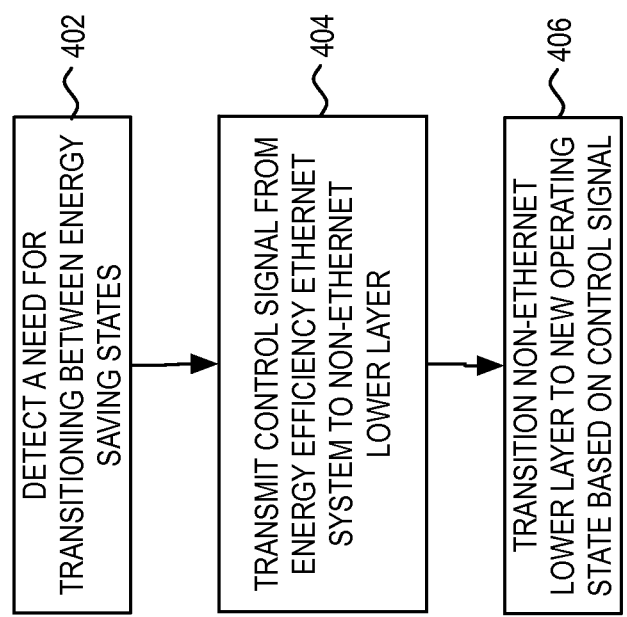
FIG. 4 illustrates an example of a process of the present invention.

Having described a general framework for creation of a unified energy-efficiency control policy domain, reference is now made to FIG. 4, which illustrates a flowchart of a process of the present invention. As illustrated, the process begins at step 402 where an energy-efficiency control policy within an Ethernet device detects a need to transition between operating states (e.g., from an active state to an energy saving state, from an energy saving state to an active state, from a first energy saving state to a second energy saving state, etc.). As noted above, the energy-efficiency control policy can be designed to leverage traffic monitoring functions within the Ethernet device. This enables the Ethernet device to make a determination independently. In one example, the energy-efficiency control policy can also be responsive to a link partner device that transmits control signals over the data communication link to signal decisions regarding transitions between different operating states.

Regardless of the particular mechanism used to determine a need to transition to/from an energy saving state, the energy-efficiency control policy in the Ethernet device effects such a transition for one or more components within the Ethernet device. To extend the energy-efficiency control policy domain of the Ethernet device, the energy-efficiency control policy also transmits, at step 404, an energy-efficiency control signal from the Ethernet device to a non-Ethernet device that provides communication services for the Ethernet device. Upon receipt of the energy-efficiency control signal from the Ethernet device, the non-Ethernet device can then effect a corresponding state transition in the non-Ethernet device at step 406.

In general, the energy-efficiency control signals transmitted to the non-Ethernet device can be synchronized with the operation of the energy-efficiency functionality within the Ethernet device to ensure that packets are not lost or otherwise delayed. For example, when transitioning from an active state to an energy saving state, the energy efficiency control policy can transmit the energy-efficiency control signal to the non-Ethernet device after all traffic has been cleared from the transmit queues, or when transitioning from an energy saving state back to an active state, the energy-efficiency control policy can transmit the energy-efficiency control signal to the non-Ethernet device such that the non-Ethernet device is active prior to the initiation of the wake-up process or completion of all or part of the wake-up process of the Ethernet device. As the non-Ethernet device is part of the unified energy-efficiency control policy domain, its operation is now part of and coincident with the corresponding energy-efficiency functionality of the Ethernet device.

As noted, the principles of the present invention can be applied to various non-Ethernet communication links that provide a communication service to the Ethernet device. This communication service can be based on various link speeds and communication mediums. The principles of the present invention can also be applied symmetrically or asymmetrically on a given link.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments.

Also, it is to be understood that the phraseology and terminology employed herein are for the purposes of description and should not be regarded as limiting.

What is claimed is:

1. A method, comprising:
   transitioning at least part of a first device into a first energy saving state in accordance with an energy efficiency control policy of the first device, the first device utilizing an Ethernet networking technology;
   determining, using the first energy saving state, an energy efficiency control signal;
   transmitting the energy efficiency control signal from the first device to a second device, the second device utilizing a second networking technology different from the Ethernet networking technology, wherein operation of energy efficiency functions of the second device is controlled at least in part by the energy efficiency control policy;
   transitioning, using the energy efficiency control signal, the second device into a second energy saving state by controlling at least one feature of the energy efficiency functions of the second device using the energy efficiency control signal received from the first device.

2. The method of claim 1, wherein the second device is coupled to a third device utilizing the second network technology different from the Ethernet networking technology, wherein the third device is coupled to a fourth device utilizing the Ethernet networking technology.

3. The method of claim 2, wherein a first interface between the second and third devices is a coaxial cable link.

4. The method of claim 2, wherein a first interface between the second and third devices is a fiber optic link.

5. The method of claim 2, wherein a first interface between the second and third devices is a wireless link.

6. The method of claim 1, wherein the energy efficiency control signal is an in-band control signal.

7. The method of claim 1, wherein the energy efficiency control signal is an out-of-band control signal.

8. The method of claim 1, wherein the energy efficiency control policy is based on IEEE 802.3.

9. The method of claim 1, further comprising:
   monitoring incoming traffic of the first device over a timeframe; and
   transitioning at least part of the first device using the monitored incoming traffic.

10. The method of claim 9, wherein the first energy saving state is an idle state in response to determining the monitored incoming traffic is zero.

11. The method of claim 9, wherein the first energy saving state is a reduced transmission rate of a main rate of the first device in response to determining the monitored incoming traffic is under a threshold amount.

12. A system, comprising:
   a first device utilizing an Ethernet networking technology, the first device comprising a memory including an energy efficiency control policy configured to transition, in response to determining the monitored transmission traffic is under a threshold amount, at least a part of the first device into a first energy saving state in accordance with an energy efficiency control policy of the first device, the first device utilizing an Ethernet networking technology, the first device configured to generate an energy efficiency control signal in response to transitioning to the first energy saving state using the monitored traffic and the first energy saving state and transmit the energy efficiency control signal to a second device, wherein the second device utilizes a second networking technology different from the Ethernet networking technology, and wherein the energy efficiency control signal is configured to modify operation of energy efficiency functions of the second device by controlling at least one feature of the energy efficiency functions of the second device to transition the second device into a second energy saving state.

13. The system of claim 12, wherein the second networking technology comprises a copper twisted pair link.

14. The system of claim 12, wherein the second networking technology comprises a coaxial cable link.

15. The system of claim 12, wherein the second networking technology comprises a fiber optic link.

16. The system of claim 12, wherein the second networking technology comprises a wireless link.

17. The system of claim 12, wherein the energy efficiency control signal is an in-band control signal.

18. The system of claim 12, wherein the energy efficiency control signal is an out-of-band control signal.

19. The system of claim 12, wherein the energy efficiency control policy is based on IEEE 802.3.

20. A method, comprising:
   monitoring incoming traffic of a first device over a timeframe;
   transitioning, in response to determining the monitored traffic is under a threshold amount, at least part of the first device into a first energy saving state using an energy efficiency control policy of the first device in accordance with an energy efficiency control policy of the first device, the first device utilizing an Ethernet networking technology;
   generating, using the monitored traffic and the first energy saving state, an energy efficiency control signal in response to transitioning the first device into the first energy saving state;
   transmitting the energy efficiency control signal from the first device to a second device utilizing a second networking technology different from the Ethernet networking technology, wherein operation of energy-efficiency functions of the second device is controlled at least in part by the energy efficiency control policy; and
   transitioning, using the energy efficiency control signal, the second device into a second energy saving state by controlling at least one feature of the energy efficiency functions of the second device using the energy efficiency control signal received from the first device.

21. The system of claim 12, further comprising the second device.

22. The method of claim 2, wherein a first interface between the second and third devices is a copper twisted pair link.

* * * * *